US005651894A

United States Patent [19]
Boyce et al.

[11] Patent Number: 5,651,894
[45] Date of Patent: Jul. 29, 1997

[54] WATER PURIFICATION SYSTEM AND METHOD

[75] Inventors: Allen R. Boyce, Portland, Oreg.; James S. Yates, Vancouver, Wash.

[73] Assignee: SEH America, Inc., Vancouver, Wash.

[21] Appl. No.: 612,796

[22] Filed: Dec. 13, 1995

Related U.S. Application Data

[63] Continuation-in-part of Ser. No. 233,809, Apr. 26, 1994, abandoned.

[51] Int. Cl.[6] ........................... B01D 63/00
[52] U.S. Cl. .................. 210/652; 210/641; 210/651; 210/654; 210/638; 210/912
[58] Field of Search .................. 210/652, 195.2, 210/257.2, 651, 654, 638, 631, 688, 641, 912

[56] References Cited

U.S. PATENT DOCUMENTS 4,824,574  4/1989  Cadotte et al. ............... 210/654
5,152,901  10/1992  Hodgdon ....................... 210/654
5,207,916  5/1993  Goheen et al. ................. 210/652
5,238,574  8/1993  Kawashima et al. ........... 210/257.2
5,277,817  1/1994  Martyak et al. ................ 210/639
5,403,490  4/1995  Desai ............................ 210/652

*Primary Examiner*—Ana Fortuna
*Attorney, Agent, or Firm*—Chernoff, Vilhauer, McClung & Stenzel

[57] ABSTRACT

An ultrapure water purification scheme that incorporates the use of certain RO filtration membranes that are especially susceptible to oxidative attack employs the combination reducing/metals scavenger/biocidal agent dithiocarbamate as a pretreatment additive to maintain a non-oxidizing environment, to bind contaminant metals to improve their removal from source water, and to reduce microbial content. In addition, the generation of oxidants by cavitation effects is avoided by a reduced pressure retentate recycle. Both measures prevent oxidative attack and fouling of the RO membranes.

5 Claims, 3 Drawing Sheets

WATER PURIFICATION SYSTEM AND METHOD

This is a continuation in part of application Ser. No. 08/233,809 filed Apr. 26, 1994, now abandoned. The invention relates to ultrapure water purification systems and, in particular, to systems and methods for removing oxidative impurities from potable water.

BACKGROUND OF THE INVENTION

The demand for inexpensive, high quality, easily produced ultrapure water is increasing in a number of industries. In the semiconductor industry for example, as the scale of microchip semiconductor devices continues to decrease, there is an increasing need for reduction of residual contaminants in process water. Conventional standards for ultrapure water are deionization to a resistivity of 18 megohms, absence of particles greater than 0.20 micron, and the presence of fewer than 1.0 bacterial colonies per milliliter.

FIG. 1 is a simplified schematic diagram of a conventional large-scale industrial water ultrapurification system 10. Because source water 12 may come from wells, surface runoff, or municipal supplies, and may contain a variety of metals, organic compounds, silts, or other contaminants, scheme 10 employs a variety of processes and components to purify source water 12 to the desired water quality. Source water 12 generally undergoes multistage processing through a pretreatment stage 14, a reverse osmosis (RO) treatment stage 16, and a post-treatment stage 18 before reaching a usage stage 20.

Pretreatment stage 14 is typically designed to remove contaminants that may have deleterious effects on some of the downstream purification processes that may contain more sensitive or expensive components. For example, metal contaminants, such as iron, copper, aluminum, manganese, sodium, or calcium, are known to cause a variety of problems throughout a water ultrapurification scheme.

The most common metal contaminants, iron and manganese, are generally treated by aeration, chemical oxidation, or media filtration. The presence of iron in water to be purified is especially troublesome, as hydroxides formed during oxidation for its removal tend to build up on anionic deionizing resin beds, and may slough off such beds without warning and be carried downstream to the point of use, thereby substantially interfering with the manufacturing process. The pretreatment stage 14 shown in FIG. 1 oxidizes contaminant metals in source water 12 by adding a pH modifier 22 and an oxidizing agent 24, such as chlorine. The oxidized metals precipitate out of solution and are subsequently removed by large particle filters 26.

Because oxidizing agents 24 also pose problems to many downstream process components, in order to remove them from the water treatment systems, a reducing agent 28, such as sodium bisulfite, may be subsequently added to the oxidized source water 12, or the source water 12 may be passed through granular activated carbon (not shown), before it is conveyed to the RO membranes treatment stage 16. A valve 30 regulates the source water flow through a heat exchanger 32 employed to increase the temperature of the source water 12 to about room temperature to facilitate its flow through the RO treatment stage 16. Source water 12 may also be subjected to a set of prefilters 34 before it is finally conveyed by a high pressure pump 36 to the RO treatment stage 16.

State-of-the-art water ultrapurification schemes have recently begun to employ RO membranes 40 and 42 in double pass configurations, where each pass is typically arranged in a series array where the permeate of the prior membrane is stored, then pumped as the feed to the next set of membranes. The reject water or retentate from each later pass through an RO membrane is typically recycled back to the feed side pump, repressurized, and then to the feed side of the earlier RO membranes. The RO treatment stage 16 in FIG. 1 depicts such a double pass configuration through the two sets of RO membranes 40 and 42.

Pump 36 forces pretreated feed water 44 through a set of RO membranes 40 at a pressure in the range of 300 to 500 psi, the first pass permeate 46 being at a reduced pressure relative to the feed side pressure and is then directed to a storage tank 48 that is blanketed with nitrogen from nitrogen source 50 to prevent the dissolution of oxygen, carbon dioxide or other gaseous contamination. The first pass retentate containing filtered impurities 52 is emptied into a sewer 54 or, after detoxification, into a National Pollution Discharge Elimination System (NPDES)-permitted outfall.

A pump 56 repressurizes and directs the permeate of RO membranes 40 from storage tank 48 as feed to a second set of RO membranes 42. The second pass RO permeate 66 is directed to a second storage tank 68 that is also blanketed with nitrogen from nitrogen source 70. The second pass RO retentate 72 is recycled to the feed side 76 of pump 36, and thence to RO membranes 40. Each pass of a conventional pre-RO-filtration scheme 10 utilizes a storage tank and a pump and tends to remove about 90% of the salts from the water; in combination with the double pass RO system shown in FIG. 1, about 99% of the salts are removable from the water, and the transition metal ions are removed to a parts-per-billion level. However, there is still a need in the production of ultrapure water for a degree of removal of such metal ion contaminants to a still lower parts-per-trillion level.

Cellulose acetate (CA) is the most commonly employed RO membrane type and is used in flat sheet, spiral-wound and hollow fiber ("HF") configurations. However, polyamide and polyimide (collectively referred to as "PA") thin-film composite ("TFC") and PA HF membranes have several advantages. PA TFC membranes generally exhibit higher rejection and greater flux than most RO membranes. Unfortunately, the chemical makeup of RO membranes, including CA and PA, makes them highly susceptible to oxidizing agents used in RO pretreatment, such as chlorine, even at very low levels. For example, CA membranes can tolerate up to 1 ppm chlorine, but PA membranes typically can tolerate only up to 0.1 ppm chlorine. Therefore, any oxidizing agent 24 used upstream of the RO membranes 40 and 42 must be virtually completely neutralized by the reducing agent 28 before reaching the RO filters. The standard approach of adding sodium bisulfite to neutralize the chlorine typically requires the downstream removal of the added sodium. However, removal of chlorine upstream of the RO membranes 40 and 42 leaves them susceptible to biofouling by micro-organisms. Thus, some water purification schemes 10 purposely leave 0.3 to 0.5 ppm residual chlorine in the upstream water, which is, of course, incompatible with the use of PA RO membranes. Conventional purification schemes must therefore carefully regulate the concentrations of chlorine and bisulfite during water pretreatment because small shifts in their concentrations can degrade either RO membranes or the quality of the product water. Understandably, the constraints imposed by such delicate balancing of chemical concentrations tend to weigh against the use of the more efficient PA TFC and HF membranes.

After RO treatment stage 16, RO product water 80 is conveyed by pump 82 to resin beds 84 in the post-treatment stage 18. Residual chlorine from RO treatment stage 16 is treated before it reaches resin beds 84, since contact with beds 84 may result in the sloughing off of organic materials from the resin, which in turn can result in unacceptably high total organic content (TOC) levels in the ultrapure product water. High TOC levels in the water used to manufacture semiconductors lead to wafer contamination and reduction of yield.

Further post-treatment of ultrapure water may employ a microfilter 86 to capture microorganisms and resin particles, an ultraviolet (UV) sterilizer 88 to kill any microorganism not removed by microfilter 86, and a submicrofilter 90 to remove any residual cellular debris. Post-treated water 96 is then directed to a storage tank 98 that is also blanketed with nitrogen from nitrogen source 100 until water 96 is needed at usage stage 20. When post-treated water 96 is desired for use in manufacturing, it is conveyed by pump 102 through polishing resin beds 104 and another UV sterilizer 106 that is positioned between secondary microfilter 108 and secondary submicrofilter 110 before reaching usage stage 20. Unused post-treated water 96 is returned to storage tank 98.

Because pretreatment additives used in conventional ultrapurification systems often result in deleterious effects downstream in connection with further water treatment, an alternative, less deleterious pretreatment process would greatly simplify water purification schemes.

An object of the present invention is, therefore, to provide a simplified and efficient water ultrapurification scheme.

Another object of the invention is to provide a system and method for removing metals from source water.

A further object of the invention is to provide such a system and method that does not employ oxidizing agents.

These objects and others are met by the present invention, which is summarized and described in detail below.

SUMMARY OF THE INVENTION

The key to the present invention lies in the use of the combination reducing/metals scavenger agent dithiocarbamate (DTC) prior to an RO treatment to precipitate contaminant metals from the RO feed and at the same time create and maintain a non-oxidizing, or reducing environment, i.e., a chemical environment that has a negative oxidation/reduction potential ("ORP"). Because oxidizing agents such as chlorine tend to attack RO membranes, a reducing environment is inherently safer for RO membranes, especially the highly sensitive PA TFC and PA HF membranes. Such a pretreatment scheme therefore dispenses with the prior art need to add and carefully regulate the concentration of oxidizing agents and then to neutralize them by the addition of reducing agents. In addition, DTC also acts as a mild biocide to help prevent biofouling of the RO membranes.

The pre-RO treatment use of DTC also facilitates the use of the more efficient but oxidation-sensitive RO membranes, leading to another aspect of the invention, namely a double-pass RO configuration that recycles retentate from a second RO unit at a reduced pressure to the feed of a first RO unit, thereby maintaining a reducing environment and dispensing with the prior art steps of storing product water from the first RO stage and then pumping the stored water to the second RO stage. By stepping down the pressure in the recycled retentate, oxidant-producing cavitation is prevented, leading to the effective maintenance of an environment favoring reduction over oxidation throughout the RO treatment stage.

DETAILED DESCRIPTION OF PREFERRED EMBODIMENTS

Figure 1:
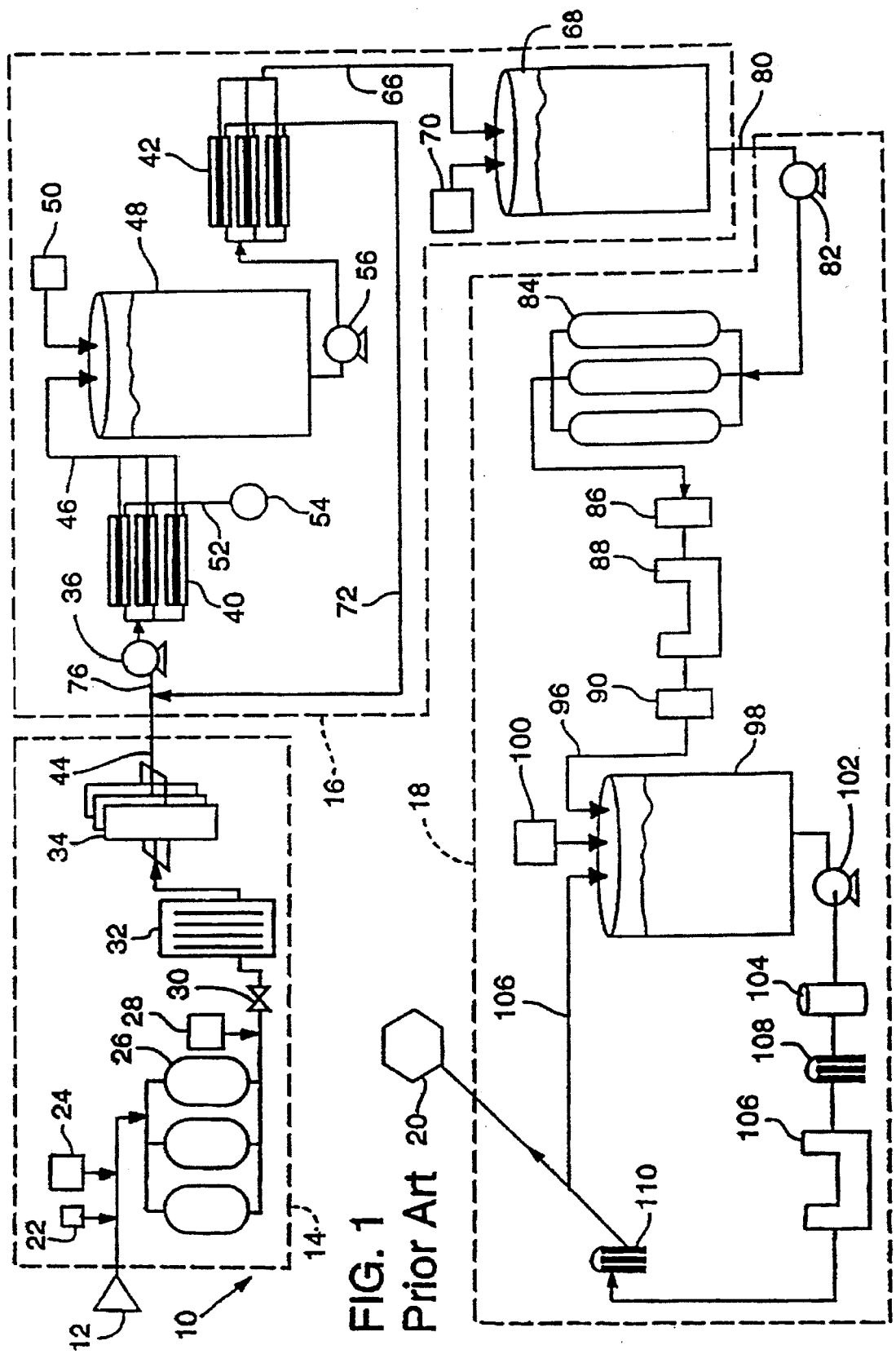
FIG. 1 is a schematic of a conventional water purification scheme employing particulate filters, an oxidizing pretreatment environment, double-pass RO filtration, and pumps between each pass of RO filtration.
Figure 2:
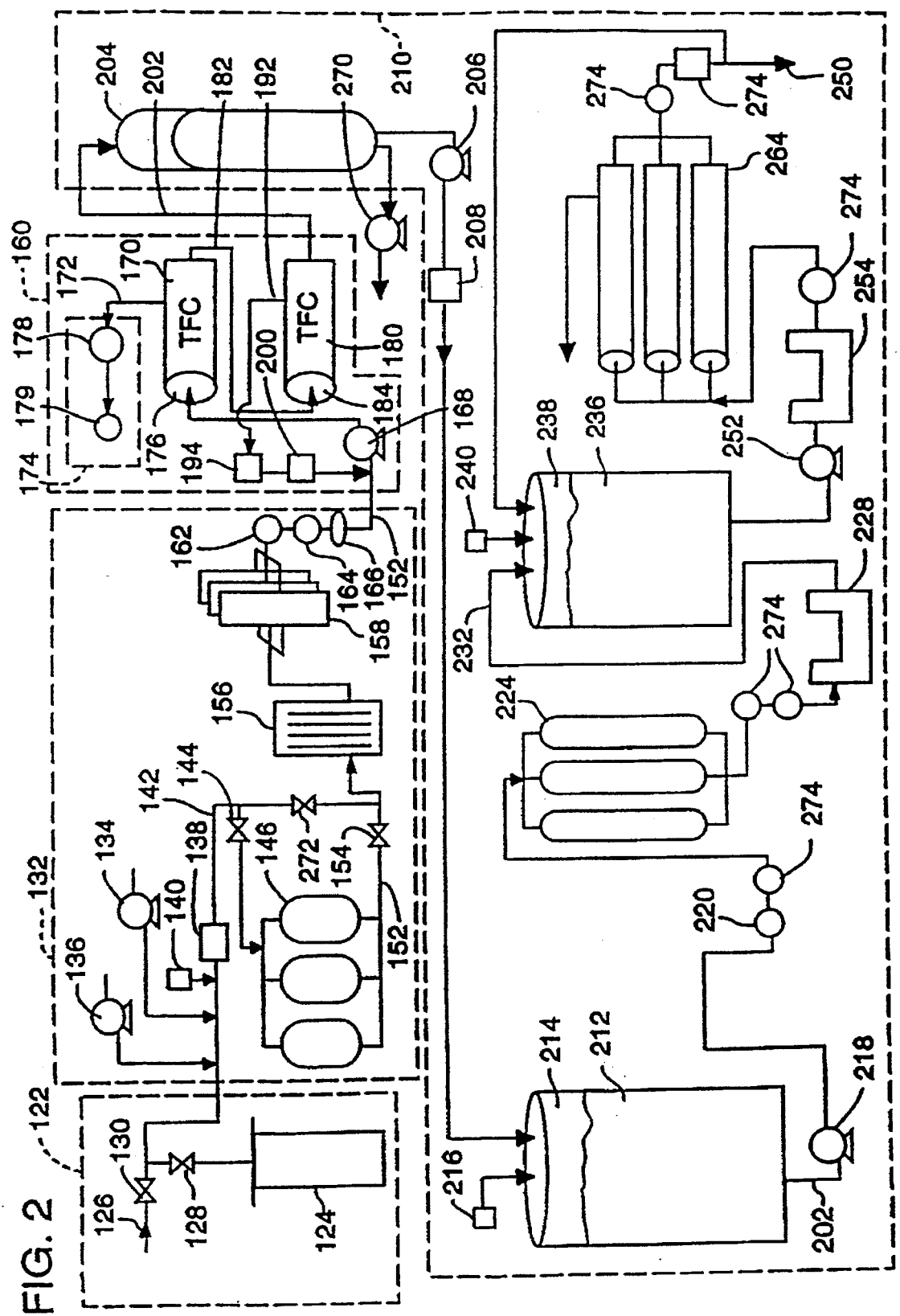
FIG. 2 is a schematic of an embodiment of a water purification scheme of the present invention employing a DTC pretreatment and an RO post-treatment.

FIG. 2 presents a preferred embodiment of a water purification scheme 120 employed by the present invention. Potable feed water 122 is obtained from any of a variety of sources, such as from wells 124, surface runoff (not shown), or city water supply 126. Water from these sources is controlled by separate valves 128 and 130, respectively, because water from these sources may have different pH's, contaminants, or other characteristics. For example, it may be desirable to mix feed water 122 from the different sources in certain proportions, or it may be desirable to treat feed water from different sources independently.

Water pretreatment stage 132 employs the reducing/metal scavenger agent DTC, preferably in the form of an alkaline earth metal salt of dimethyl dithiocarbamate in agent-dispensing unit 134 instead of conventionally employed oxidizing agents such as chlorine, oxygen, ozone or potassium permanganate. A most preferred form of DTC is calcium dimethyl dithiocarbamate. If desired, the pH of the source water may be adjusted by the addition of a pH-modifying agent 136. DTC is injected from dispenser 134 into water 122 to bind metal contaminants and at the same time create a reducing environment and act as a biocide.

DTC does not create toxic waste disposal problems because it has a fairly low toxicity, degrades rapidly in water, and is easy to remove from waste water by biodegradable oxidants such as ozone and hydrogen peroxide.

The injection rate of DTC should result in a concentration of about 4–6 ppm DTC per 1 ppm of total metals content in source water 122, preferably 5.15 ppm. An in-line static mixer 138 may be used to increase the exposure of DTC to metal contaminants in source water 122, thereby eliminating the need for a mixing tank or an excessive length of pipe. DTC forms a generally insoluble complex with metal cations in source water 122. The newly formed complex forms colloidal-like particles which are easily removed by filtration from source water 122. The process of the present invention is particularly useful for treating source water containing high concentrations of ferrous ions.

After sufficient contact time for the DTC to complex with the contaminant metals, source water flows through a flow regulation valve 144 to a filtration unit 146. In the event that the source water contains residual amounts of an oxidant such as chlorine or fluorine, a reducing agent 142 may be added to neutralize the same prior to entering filtration unit 146. Filtration unit 146 may employ a variety of common filtration techniques, such as multi-media bed filtration, sand or cartridge filtration, or crossflow filtration. Filtered water 152 may be passed through another flow regulation valve 154 and through a heat exchanger 156 before water 152 is directed into prefilters 158 and RO treatment stage 160. Heat exchanger 156 increases the temperature of water 152 to about room temperature to optimize its flux (flow volume per membrane area per unit time) through first and second pass RO membranes 170 and 180, respectively. It will be appreciated that chlorine, pH, or ORP monitors 162, 164, or 166, respectively, or other monitors may be employed to determine certain characteristics of water 152 before it reaches RO treatment stage 160, and respective modifying agents may be employed to adjust these characteristics without departing from the spirit of the present invention.

Figure 3:
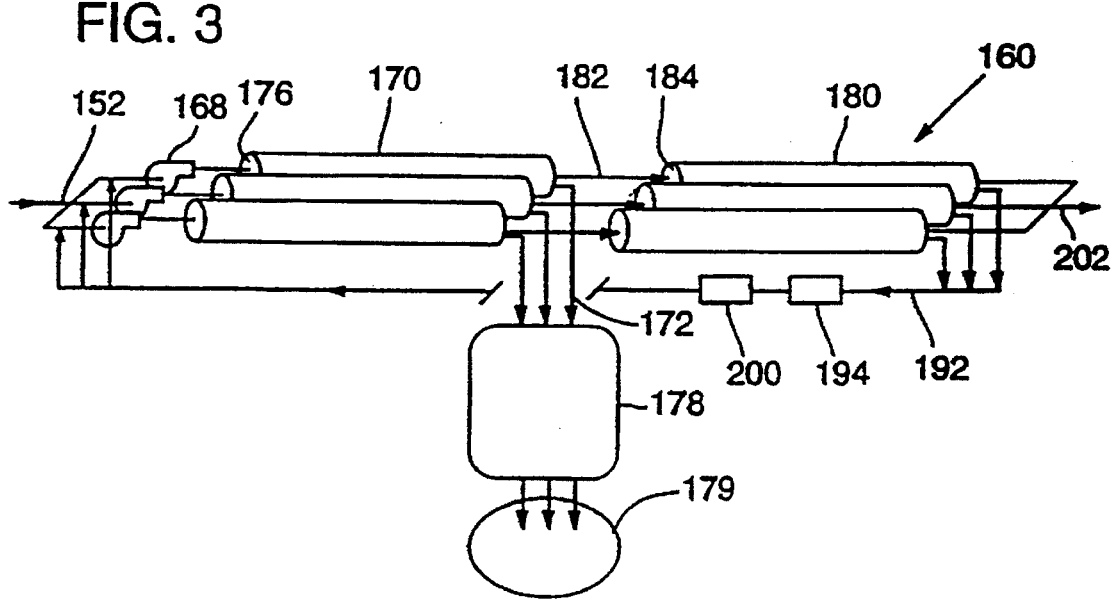
FIG. 3 is a schematic showing greater detail of the RO treatment stage shown in FIG. 2.

With reference to FIG. 3, a preferred purification scheme 120 employs a double pass RO hydraulic treatment configuration. High pressure pump 168 delivers filtered water 152 at a pressure of 350 to 550 psi, preferably 450 psi (3.1 MPa) to one or more first pass RO membranes 170. First pass reject water or retentate 172 is sent to waste post-treatment stage 174 while first pass product water or permeate 182 is sent directly to the feed side 184 of one or more RO membranes 180 without an intervening pump or to an optional pre-disposal detoxification treatment 178 and then to a disposal site 179.

In a preferred embodiment, TFC membranes are used in the double pass RO treatment of the present invention. Because TFC membranes have greater flux and so cause smaller decreases in water pressure than most other RO membranes, first pass permeate or product water 182 may be sent directly to RO membranes 180 at about 250 psi (1.7 MPa) without the expense or energy consumption of an intervening pump. Second pass retentate 192 is fed to the feed side 176 of RO membranes 170, while second pass permeate or product water 202 is directed to post-treatment stage 210.

Cavitation is a known phenomenon that may develop in the pumping of a liquid such as saltwater, whereby vapor bubbles are formed by an increase in the velocity of the liquid, coupled with the resulting reduction in pressure, causing gases in solution such as oxygen and carbon dioxide to come out of solution. When the pumped liquid reaches a region of higher pressure the vapor bubbles or "cavities" in the liquid collapse, creating extremely high pressures in the region of collapse, which leads to noise, vibration, pitting and eventual loss of material from conduits, valves and the like in the high pressure region.

Cavitation has been observed to occur frequently across a reject or retentate valve on RO systems, and is evidenced by vibration and/or noise at the retentate valve and pitting, with eventual loss of material from the wetted valve components, beginning typically at the final cross-section of the throat of the valve. Some of the material lost from the valve components can be carried downstream to foul RO membranes. As mentioned, when cavitation occurs dissolved gases come out of solution; those gases in an RO deionization system are oxygen and carbon dioxide. The freed oxygen results in an oxidizing environment, which is measured as a positive millivolt reading on an ORP meter. This oxidizing environment oxidizes ferrous iron in solution to ferric oxide or iron rust which, because of its distinctive reddish brown tint, has been visually observed accumulating on the walls of clear plexiglass retentate flow meter sight tubes, and has been collected on filter pads. Carbon dioxide coming out of solution may also alter the pH and cause silica to precipitate onto the first pass RO membranes 170 when the water is cycled back to the front of the system. Iron fouling may also form iron silicates, which in turn may contribute to the precipitation of silica, which also leads to fouling of RO membranes in the system.

It has been discovered that a substantial pressure reduction in the retentate from an RO unit, on the order of 40 to 60%, substantially eliminates cavitation and its resulting generation of oxygen and carbon dioxide in the RO-treated water, thereby eliminating both the degradation of valves in the system and the generation of iron oxide, iron silicates and precipitated silica, all of which would otherwise foul the RO membranes. Such a retentate pressure reduction may be effected in single- or multiple-pass RO systems and the reduced pressure retentate is recycled to the feed of at least one RO separation membrane system. In an especially preferred embodiment, this feature of the present invention is used in a multiple-pass RO system, and the stepped-down pressure retentate is recycled to the feed of an upstream RO separation membrane system so as to reduce the ORP of the treated water.

Figure 4:
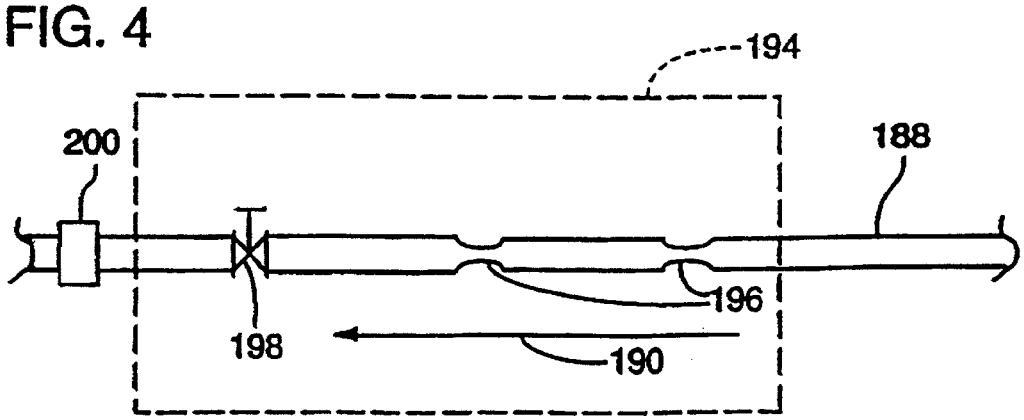
FIG. 4 is a schematic showing greater detail of the pressure reducer of FIG. 3.

Thus, for example, with reference to FIG. 4, second pass retentate 192 flowing through pipe 188 in flow direction 190 is subjected to a 40–60% reduction in pressure by pressure reducer 194 prior to its being recycled to the feed side of first pass RO unit 170. In a preferred embodiment, pressure reducer 194 employs two restrictions 196 in pipe 188, coupled with a downstream needle valve 198, to effect approximately a two-to-one, or 50% reduction in water pressure. In a prototype system of purification scheme 120 having embodiments with and without a reduction in the pressure of the second pass RO permeate, the oxidation/reduction potential (ORP) value was approximately −64 mV with pressure reducer 194 and approximately +65 mV without the pressure reducer, while at the same time, the respective absence and presence of oxidizing agents was confirmed with and without the use of the pressure reducer by the lack of formation of red ferric oxide and formation of the same with and without the use of the pressure reducer. (The measurements were obtained from an ORP monitor 200 positioned in-line with second pass RO permeate 192.)

RO treatment stage 160 concentrates any residual DTC from water pretreatment stage 132 into first pass retentate 172. If desired or required by environmental regulations, post-treatment stage 174 may employ an oxidizing agent or process 178 to neutralize the residual DTC prior to discharge of first pass retentate 172 into a sewer or a NPDES-type water shed 179 in compliance with EPA regulations. Suitable oxidizing processes or agents include ozone, aeration towers, air or oxygen diffusers, inductors, or chemical oxidizers.

With reference again to FIG. 2, second pass permeate 202 is typically degassed by vacuum degassifier 204 and conveyed by pump 206 through an oxygen monitor 208, and then to storage tank 212 having a gaseous nitrogen environment 214 supplied from nitrogen source 216. Post-treatment stage 120 continues by employing pump 218 to convey product water 202 through silicon and conductivity analyzers 220, ion-exchange beds 224, and UV sterilizer 228, before storing the so-treated product water 232 in storage tank 236 also having a gaseous nitrogen environment 238 supplied by another nitrogen source 240. Prior to reaching usage point 250 in an industrial process, post-treated product water 232 is conveyed by pump 252 through a second UV sterilizer 254 and passed through submicron filters 264. A variety of additional so-called polishing steps may be performed on product water 232 before it is used.

Any number of additional pumps 270 and valves 272 may be situated throughout purification scheme 120 to increase and control the flow of water. Additional monitoring devices 274 may also be situated throughout purification scheme 120 to indicate the water quality and determine whether any of the components need to be replaced. Such monitoring devices 274 may test for such characteristics as pH, conductivity, resistivity, ORP, and the concentrations of oxygen, carbon dioxide, chlorine, silica, TOC, and sodium.

RO membranes 170 and 180 are preferably of the TFC type although other membrane types such as spiral-wound or HF membranes may be employed. An especially preferred RO membrane is a PA-containing TFC membrane produced by UOP Fluid Systems or Hydranautics in San Diego, Calif. Even though TFC membranes are highly susceptible to oxidizing agents and biofouling, the absence of a chemically oxidizing environment and the presence of a biocidal environment provided by the DTC pretreatment permits their efficient use. The DTC-induced non-oxidizing or negative ORP environment not only extends the life of the TFC RO membranes, but also extends the intervals between cleaning cycles for the membranes. This results in fewer production interruptions and shutdowns. The combination of the DTC pretreatment and the double pass RO membrane embodiment also greatly increases the water quality by decreasing the concentration of transition metal ions, especially that of iron, to a previously unachieveable parts-per-trillion level. Because of the virtual absence of iron ions in the ultrapurified water, and because of the virtually oxidant-free nature of the water that is achieved by the present invention, hydroxides of iron are not formed and so do not build up on anion exchange resins of deionizing beds downstream, thereby eliminating this substantial threat to obtaining water of sufficient purity for use in semiconductor manufacturing.

EXAMPLE 1

A system of substantially the same design as shown in FIG. 2 but having only a single pass set 170 of Hydranautic® CAB-3 Cellulose Acetate Butyrate RO membrane filters was operated on source water from a well, the water containing silica, dissolved oxygen and various cationic metals and anions. DTC was added in a concentration of 5.15 ppm per 1 ppm total metals content after prefiltration and upstream of the RO filters and the iron content of the RO feed and the RO permeate before the deionization beds was evaluated by independent laboratories. The iron concentration in the pre-DTC-treated feed was 0.7 ppm, while that in the RO permeate was undetectable, even with methods having a detection limit of 5 ppb. No degradation or fouling of the RO membranes was observed.

EXAMPLE 2

Example 1 was substantially repeated with the exception that the pressure in the retentate line was reduced in substantially the same manner shown and described in connection with FIG. 4, and monitors were used to measure the pressure and ORP in the RO feed and the retentate, both before and after the pressure reduction. The results are shown in Table 1.

TABLE 1

| RO Flow | Pressure (psig) | ORP (mV) |
| --- | --- | --- |
| Feed | 500 | +44 |
| Retentate | 430 | +60* |
| Reduced Pressure Retentate | 215 | −65** |

*Iron oxide particles observed downstream in flowmeter.
**No iron oxide particles observed downstream in flowmeter.

EXAMPLE 3

A system of substantially the same design shown in FIG. 2 having a two-pass PA TFC membrane RO filtration scheme was operated on the same source water as in Example 1 and the concentration of dissolved oxygen and of various of its cationic and anionic components were measured, prior to the DTC RO pretreatment in the same concentration as in Example 1 (denominated "Feed" in Table 2), and at the second pass RO outlet and prior to the deionization beds ("RO outlet" in Table 2). The results are shown in Table 2 below, where all concentrations are in ppb. No degradation or fouling of the PA TFC membranes was observed, and the concentration of dissolved oxygen was maintained constant.

TABLE 2

| Component | Feed | RO Outlet |
| --- | --- | --- |
| Silica | 51,000 | 5.8 |
| Aluminum | 1.7 | <0.007 |
| Barium | 40 | <0.002 |
| Calcium | 10,000 | 0.8 |
| Iron | 680 | <0.05 |
| Lithium | 3.1 | 0.09 |
| Magnesium | 6,400 | 0.43 |
| Manganese | 170 | 0.016 |
| Nickel | 3.8 | <0.005 |
| Potassium | 2,000 | 14 |
| Rubidium | 2.4 | 0.015 |
| Sodium | 6,700 | 90 |
| Strontium | 54 | <0.002 |
| Chloride | 1,400 | 0.04 |
| Phosphate | ~100 | <0.02 |
| Sulfate | 2,800 | 0.12 |
| Dissolved Oxygen | <2.0 | <2.0 |

It will be apparent to skilled persons that many changes may be made to the details of the specific embodiments of the invention described herein without departing from the underlying principles thereof. A number of additional well-known water purification techniques or components may be added to purification scheme 120 to address contaminants in a particular water source without departing from the scope of the present invention. Similarly, purification techniques or components presented in scheme 120 may be omitted or their sequence varied. The present invention may also be employed in triple-, or other multiple-pass configurations in addition to the single- and double-pass configurations described.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In an ultrapure water purification process for purifying an aqueous feed of metals-containing water by contact with at least one reverse osmosis filtration membrane, whereby there are produced an aqueous permeate of purified water, and an aqueous retentate of non-purified water, and wherein said membrane comprises a material selected from the group consisting of polyamide, polyimide and cellulose acetate, the improvements comprising contacting said aqueous feed with 4 to 6.5 ppm of dithiocarbamate per 1 ppm metals content of said aqueous feed, recycling said retentate to said aqueous feed, and reducing the pressure of said retentate by about 40% to about 60% prior to recycling the same to said aqueous feed.

2. The process of claim 1 utilizing a first and a second reverse osmosis filtration membrane in series, wherein the pressure of the retentate of said second reverse osmosis filtration membrane is reduced and then recycled to said aqueous feed of said first reverse osmosis filtration membrane.

3. The process of claim 1 or 2 wherein said at least one reverse osmosis membrane is in a form selected from the group consisting of a thin-film composite membrane and a hollow fiber membrane.

4. The process of claim 1 wherein the concentration of said dithiocarbamate is about 5.15 ppm per 1 ppm metals content of said aqueous feed.

5. The process of claim 1 wherein said dithiocarbamate is dimethyl dithiocarbamate.

* * * * *